United States Patent [19]

Cielo et al.

[11] 3,859,590

[45] Jan. 7, 1975

[54] WAVEFORM AVERAGING RC CIRCUIT

[75] Inventors: John Robert Cielo; William Albert Moorman; Suryanarayana Krishnappa Rao, all of Kingston, N.Y.

[73] Assignee: International Business Machines Corporation, Armonk, N.Y.

[22] Filed: July 30, 1973

[21] Appl. No.: 383,741

[52] U.S. Cl. ........................ 323/17, 307/265, 321/2, 323/22 T, 323/DIG. 1

[51] Int. Cl. .......................... G05f 1/56

[58] Field of Search ............... 323/17, DIG. 1, 22 T; 321/2; 307/265–266, 267; 333/70 CR

[56] References Cited

UNITED STATES PATENTS

| | | | |
|---|---|---|---|
| 3,602,801 | 8/1971 | Williamson | 323/DIG. 1 |
| 3,697,852 | 10/1972 | Gerbitz | 323/DIG. 1 |
| 3,733,519 | 5/1973 | Griffey | 323/DIG. 1 X |
| 3,772,588 | 11/1973 | Kelly et al. | 321/2 X |

*Primary Examiner*—Gerald Goldberg

[57] ABSTRACT

A waveform averaging circuit composed of resistance, capacitance and diodes yields an output which is similar to an inductor-capacitor filter in rectified outputs of a transistor switching regulator. The LC filter is employed in a load output while the RC filter is employed in a feedback sense circuit for control of the regulator. The RC circuit provides a cost and weight reduction and provides less phase shift than would result from the employment of an LC filter in its stead.

10 Claims, 2 Drawing Figures

WAVEFORM AVERAGING RC CIRCUIT

BACKGROUND OF THE INVENTION

1. Field of the Invention

This invention relates to electrical function circuits and more particularly to an improved filter circuit for providing an output which corresponds to the half-wave average of the input applied thereto.

2. Description of the Prior Art

Filters are widely used in power supplies and elsewhere to smooth an electrical signal by removal or reduction of AC components therein. In the case of a DC power supply it is often desired that the AC ripple otherwise present in the output be removed and in the case of a transistor switching regulator, the output of the transistor switch may provide energy only in pulsating form and it becomes the function of the output filter to convert this pulsating energy into the desired direct current level. In a transistor switching regulator, the entire control is frequently predicated on varying the duration, as distinct from the amplitude, of the energy pulses, and to translate this variation into control of the output DC level, it is necessary that the output filter be of an integrating or averaging kind as opposed to a peak responsive filter. Accordingly, LC filters are widely used in this circuit employment. For providing a feedback sense signal for the control of a transistor switching regulator of this kind, the prior art has provided circuits which sense the load output of the regulator so as to obtain a signal indicative of needed changes in the duty cycle of the switching transistor. This arrangement does not, absent the addition of some DC decoupling device, provide DC isolation between the input and output of the regulator.

To provide DC isolation between the input and output of such a regulator, the transistor switching regulator has been coupled to the output load circuits by an isolating transformer, and additional winding on the transformer has been utilized to provide the feedback signal. Thus, the signal has DC isolation from the load output circuit, but it is necessary that the circuit which derives the sense signal from the additional secondary track the load output in a sufficiently parallel fashion to provide a meaningful control signal. Accordingly, a filter circuit has been utilized in the sense circuit which is similar to the filter circuit in the load output circuit or circuits, so as to have a similar electrical characteristic to yield the desired tracking function. This dictates, then, employment of a LC filter in the sense circuit which is undesirably large, heavy and expensive.

Resistor-capacitor filters have been used widely and have the advantage that the resistor employed is usually lighter and less expensive than the inductor of an LC filter. Since the resistor of an RC filter is dissipative, this kind of filter is usually seen as a peak filtering filter in employments wherein the current drain is very light. As the load is increased, the potential across the filter capacitor gradually decreases, and at no point is the output of the filter inherently an average of the input.

SUMMARY OF THE INVENTION

According to one aspect of the present invention, a network is provided which yields an output which is the half-wave average of the input applied thereto, the network including an RC filter having an input element poled to conduct during application of an input potential of a first predetermined level so as to apply that potential to the RC filter, and means adapted to apply a second potential level to the RC filter during application of input potential of a second predetermined level.

According to another aspect of the invention, the means to apply the second potential level to the input of the RC filter comprises a potential source applied to the input of the filter in the absence of an input of said first potential level.

According to still another aspect of the invention, the aforesaid potential source comprises a capacitor which is charged to the second level of input during a portion of the input cycle subsequent to that portion during which the first potential level is applied to the filter.

In accordance with still another aspect of the invention, a load is provided across the capacitor of the RC filter which, together with the filter resistor of the RC filter, forms a voltage divider loading the capacitor of the filter for achieving a scaled average output across the capacitor.

In accordance with another aspect of the invention, a sense circuit is provided in a transistor switching regulator in accordance with one or more of the foregoing aspects of the invention.

Accordingly, an object of the invention is to provide an improved signal averaging network.

Still another object of the invention is to provide an RC network which will provide a voltage output which corresponds to the average of the voltage input of a given polarity applied thereto.

Still another object of the invention is to provide a sense circuit in a transistor switching regulator which is characterized by an improved network as aforesaid.

Still another object of the invention is to provide a transistor switching regulator with a sense circuit as aforesaid which provides a sense signal which corresponds to the average output of the transistor switching regulator and which has an improved phase relationship to the input of the transistor switching regulator.

The foregoing and other objects, features and advantages of the present invention will be apparent from the following description of a preferred embodiment of the invention as illustrated in the accompanying drawings.

DETAILED DESCRIPTION

Figure 1:
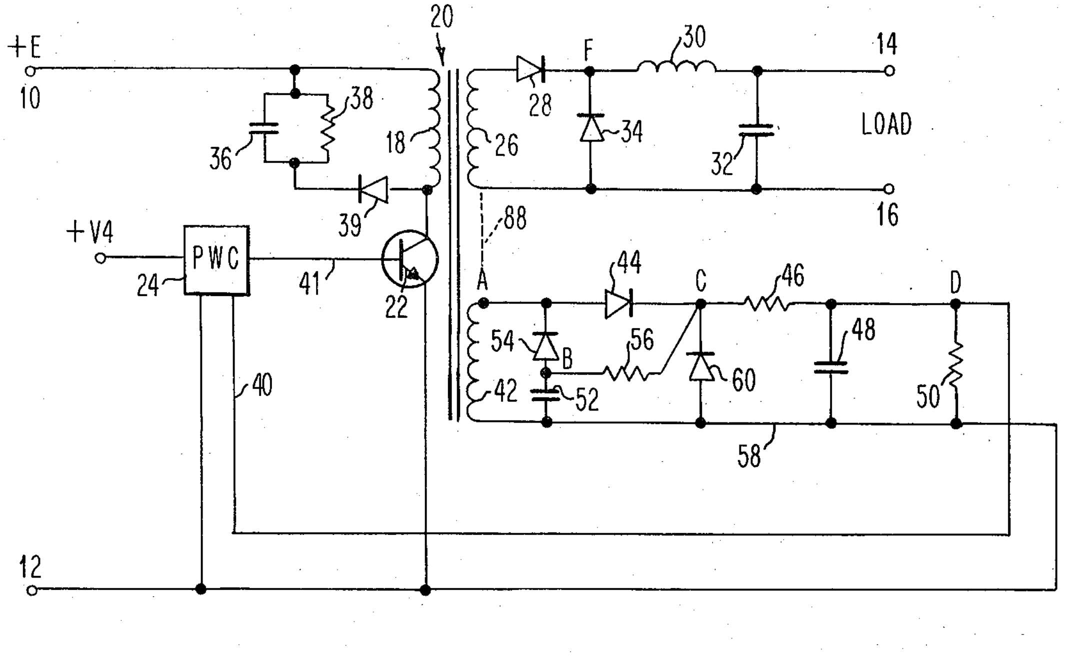
FIG. 1 is a schematic representation of a transistor switching regulator in which an improved network of the invention can be used to advantage.

In the circuit of FIG. 1, a supply voltage E is applied across input terminals 10, 12. In the circuit shown, voltage E is a positive direct current voltage which may be unregulated or only poorly regulated, and a function of the circuit is to provide a better regulated output voltage at terminals 14, 16 for connection to a useful load. The input voltage E is applied across primary winding 18 of a transformer 20 by a switching transistor 22 which is operated in an on-off manner by pulse width control 24.

Transformer 20 has an output secondary winding 26 which is connected through rectifier diode 28 to an LC filter comprising inductor 30, capacitor 32 and "free-wheeling" diode 34. When switch 22 is turned on to or near saturation, voltage E is applied across primary 18 and a voltage is induced in secondary 26 which is coupled through diode 28 to inductor 30. The resulting current flowing in inductor 30 supplies current to any load connected across output terminals 14, 16 and also adds to the charge in capacitor 32 and the storage of energy in the field of inductor 30. When switch 22 is turned off, the current through primary 18 is interrupted and a reverse voltage is induced in secondary 26. A clamp circuit comprising a capacitor 36 in parallel with a resistor 38 may be connected by a diode 39 across primary 18 to absorb the magnetization energy of transformer 20 during the collapse of the magnetic field linking primary 18 when switch 22 is off. During the off time, the reverse voltage induced in secondary 26 is blocked by diode 28 and current in inductor 30 begins to decay. A path for current through inductor 30 is provided by free-wheeling diode 34 which is forward biased at this time.

A function of pulse width control circuit 24 is to vary the on time of switch 22 in a cyclic manner so as to maintain the voltage across output terminals 14, 16 at a predetermined level despite changes in the input voltage across terminals 10, 12. To perform this function, pulse width control 24 utilizes a sense input 40 which is compared in circuit 24 with a reference to control the on-drive time of the base drive signal provided on line 41 to the switching transistor 22. In order to simplify the diagram, the details of pulse width control 24 are not shown. commonly, a circuit of this kind comprises a reference such as a zener diode powered from any convenient source, a differential amplifier to compare the signal fed back on line 40, or a predetermined portion of that signal, with the zener reference, and an on-off control responsive to that difference. The on-off control may, in simple instances, be a simple limit cycle type of operation in which whenever the output of the differential amplifier is of one sign the switching transistor 22 is turned on and when it is of the opposite sign it is turned off, or it may be a more elaborate circuit such as one including an oscillator driven circuit which provides a fixed frequency output which has an on-time responsive to the sense-reference difference. The prior art includes a large number of such circuits in transistor switching regulators, and the details thereof form no part of the present invention.

Transformer 20 provides the advantage that one or more load circuits, such as load circuit 26, 14, 16, can be provided which are direct current isolated from the input circuit 10, 18, 22, 12. Thus the load across output terminals such as 14, 16 can have a ground which is independent of that of the input terminals 10, 12. Accordingly, it is desired that the feedback sense signal on line 40, while tracking the voltage applied to the load across terminals 14, 16, be isolated therefrom so far as ground reference is concerned. To provide this isolation, an independent secondary winding 42 on transformer 20 is employed as the feedback source. This winding 42 is provided with a network in accordance with the invention which yields an output at point D connected to sense line 40 which closely tracks, i.e., is substantially a predetermined linear function of, the output voltage at terminal 14 of the load circuit of the regulator.

This network comprises a rectifier 44 and an RC filter network including input resistor 46 in series and filter capacitor 48 across the output. Another resistor 50 in parallel with filter capacitor 48 provides a relatively fixed load to the circuit and acts with filter resistor 46 as a voltage divider.

When switch 22 is on and primary drive current flows through winding 18, a voltage is induced in secondary winding 42 which provides current through diode 44 and resistor 46 in series, to capacitor 48 and resistor 50, in parallel. During this period of time point C at the input of the RC filter is nearly at the level of point A, at the output of winding 42, less the small forward bias voltage drop in diode 44.

Means are provided to bring point C to a second level, such as a logic ground level, when switch 22 is off and voltage of the opposite polarity is induced in secondary 42, back biasing diode 44. In accordance with a preferred embodiment of the invention, this means comprises a capacitor 52 which is connected across winding 42 by diode 54 which is poled to conduct during the reverse polarity output of winding 42. The reverse charge thus provided at terminal B of capacitor 52 is connected to one end of a resistor 56. The opposite end of resistor 56 is connected to point C at the input of filter resistor 46, which is clamped to the logic ground bus 58 of the circuit by diode 60. By operation of the connection through resistor 56 and the clamping action of diode 60 point C is brought to a level which approximates that of logic ground bus 58 (more precisely below that level by the amount of the forward bias drop of diode 60) when transistor switch 22 is in its off condition.

Figure 2:
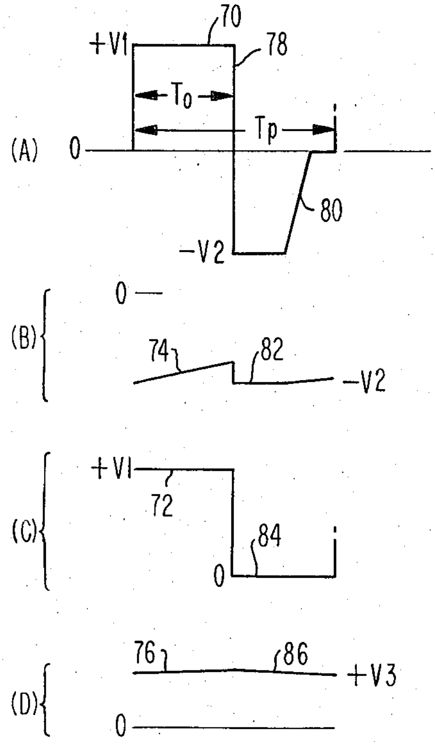
FIG. 2 is a waveform diagram indicative of voltage relationships at various points in the circuit of FIG. 1 during operation thereof.

FIG. 2 illustrates the aforedescribed operation. When transistor switch 22 is turned on by a forward bias base drive signal on line 41, current flows from terminal 10, through primary 18 and switch 22 to terminal 12, inducing a voltage in the secondary windings, including winding 42. Curve A shows the resulting voltage at point A in FIG. 1, with respect to logic ground bus 58. This voltage +V1 is chiefly a function of the voltage +E applied at terminal 10 of the regulator input, multiplied by the turns ratio of primary winding 18 to secondary winding 42. As shown at 72 in curve C the voltage +V1, minus the small forward bias drop in diode 44 of FIG. 1, is communicated directly to point C at the input of RC filter 46, 48.

As will be explained with reference to the second half of the cycle under discussion, capacitor 52 had been charged in a previous cycle to voltage −V2 but the potential at point B rises slowly, as shown at 74, toward the value of point C in accordance with the time constant of the resistor 56, capacitor 52 combination. This constitutes a load on point C but has little effect on the potential thereof during this portion of the cycle, and the RC filter 46, 48 operates to provide a filtered output of approximately +V3 at point D of the filter. The output at point D during this portion of the cycle rises slightly, as indicated at 76 in curve D, but since the time constant of RC filter 46, 48 is relatively large, the slope of this rise is slight.

When pulse width control 24 operates via line 41 to turn transistor 22 off, the potential at point A drops abruptly as indicated at 78 and continues negatively to a value −V2 during the magnetization reset action of transformer 20. The reverse voltage appearing across primary winding 18 at this time is limited by clamp circuit 36, 38 to a value determined by the charge on clamp capacitor 36 plus the forward drop in diode 39. This potential is reflected into secondary winding 42 whereby point A thereof falls to a level of −V2. After the magnetization energy is transferred from winding 18 to the clamp circuit thereacross, the reverse potential across primary 18 and therefore the reverse reflected potential across secondary 42 decreases in magnitude, as indicated at 80. The appearance of voltage −V2 at point A forward biases diode 54 and recharges capacitor 52 to approximately −V2, as indicated at 82. This voltage at point B is applied to the end of resistor 56 connected thereto so as to pull point C toward value −V2, until diode 60 becomes forward biased and clamps point C to the level of logic ground bus 58, as indicated at 84 in curve C.

Accordingly, current flows out of filter capacitor 48, not only through load resistor 50 but backwards through filter resistor 46 and resistor 56 into capacitor 52. Accordingly, filter capacitor 48 discharges slightly as indicated at 86, curve D. However, as represented in curve D, the value at point D and therefore the feedback sense signal on line 40 remains relatively constant at a value of +V3 throughout the cycle.

Preferably the logic power for the pulse width control circuit 24, including its zener or other reference circuit and the output drive power on line 41 to the base of switching transistor 22 is derived from a source other than feedback sense line 40. For example, the transistor switching regulator may have a number of outputs similar to output circuit 14, 16, 26, 28, 30, 32, 34, each operated by its own secondary winding. Such other circuits are indicated at 88 and one of them may be utilized for providing power to pulse width control 24 as indicated in FIG. 1 at +V4. Thus the impedance of the sense input of pulse width control 24, to which line 40 is connected, can be of relatively high or at least relatively steady, value. In such case the output of the illustrated sense filter at point D is given by the expression:

$$V_o = V_{in} \times R_1/R_1 + R_2 \times T_o/T_p$$

where $V_{in}$ = the positive peak voltage (70) applied to point C.

$R_1$ = the value of load resistor 50 (plus the input impedance at the connection of sense line 40 to pulse width control 24).

$R_2$ = the value of filter resistor 46.

$T_o$ = the on time of switching transistor 22 and $T_p$ = the overall switching period of the regulator.

$V_o$ = the average value, +V3, at point D.

As aforestated, the resistor combination 46, 50 constitutes a voltage divider. Thus +V3 is a predetermined fraction of the half-wave average of the signal applied at point A. This provides a step-down which reduces error introduced by the forward voltage drops in diodes 44 and 60, and provides a means to accommodate the potential range desired for the feedback on line 40, to the higher potential which may be available at point A in a given circuit employment. If load resistor 50 were eliminated and the current drawn through sense line 40 were made very small, the voltage at point D would closely approximate the true average of the positive voltage at point A.

From the foregoing it will be seen that capacitor 52 operates, through resistor 56 and clamp diode 60, to hold point C at approximately logic ground during the entire off time of the transistor switch 22. Accordingly, the signal at point C is truly the analog of the signal applied to the input of the LC filters of the load outputs, such as the signal at point F, FIG. 1, whereby the desired tracking of sense filter output point D with the useful load outputs such as at terminal 14 is achieved.

Representative values of a typical sense circuit in accordance with the present invention are as follows:

Resistor 56 = 130 kilo-ohms
Resistor 46 = 17.4 kilo-ohms
Capacitor 48 = 0.68 micro-farads
Resistor 50 = 3.01 kilo-ohms
Capacitor 52 = 1,200 pico-farads
+V1 = +40 volts
−V2 = −40 volts
+V3 = +2.5 volts
$T_o$ = 10 to 35 microseconds
$T_p$ = 50 microseconds While the invention has been particularly shown and described with reference to a preferred embodiment thereof, it will be understood by those skilled in the art that various changes in form and detail may be made therein without departing from the spirit and scope of the invention.

What is claimed is:

1. In a transformer coupled transistor switching regulator having a plurality of output circuits including at least one rectified load circuit having an inductor-capacitor averaging filter and a feedback sense circuit for control of switching transistor means of said transistor switching regulator,
   the improvement comprising,
   said sense circuit comprising a half-wave rectifier and a resistor-capacitor filter comprising a filter resistor having a first terminal connected to receive energy through said rectifier when said switching transistor means is conducive and a second terminal, said resistor being coupled by said terminals in series with the output circuit of said resistor-capacitor filter,
   a capacitor coupled to said second terminal of said resistor, said capacitor being connected in parallel with said output circuit of said filter,
   and means operative when said switching transistor means is nonconductive to apply a datum potential in circuit with said first terminal of said resistor, said datum potential corresponding to the volt-time average of the full-wave signal applied to said rectifier.

2. Apparatus in accordance with claim 1 wherein said datum potential is the logic return potential level of said regulator.

3. Apparatus in accordance with claim 1 wherein said operative means comprises a potential source applied to said first terminal of said resistor in the absence of an input of a predetermined polarity to said sense circuit.

4. Apparatus in accordance with claim 3 wherein said potential source comprises energy storage means and means to said storage means during the off time of said switching transistor means.

5. Apparatus in accordance with claim 4 wherein said regulator includes an input circuit controlled by said switching transistor means, and
   inductive means coupling said input circuit to said sense circuit,
   said sense circuit including polarity responsive means operative to couple signals of said predetermined polarity from said inductive means to said first terminal of said resistor.

6. Apparatus in accordance with claim 5 wherein, said storage means comprises a second capacitor and said means to charge comprises unidirectional means connected in series with said second capacitor across said inductive means and poled to charge said second capacitor during reverse polarity output of said inductive means, and impedance connection between said potential source comprises an impedance connection between said capacitor and said first terminal of said filter resistor, and clamping means operative to limit reverse excursion of said first terminal of said resistor substantially to said datum potential.

7. A half-wave pulse averaging circuit adapted to respsond a full-wave signal comprising, a resistor-capacitor filter comprising input polarity control means, filter resistor means connected by a first terminal to receive energy through said control means when an input signal of a first polarity is applied to said filter, said resistor means being coupled in series with the output circuit of said filter, capacitor means coupled to said resistor, in parallel with the output of said filter, and means operative when an input signal of a second polarity is applied to said filter, to apply a datum potential in circuit with said first terminal of said resistor means, said datum potential corresponding to the base value of the partial wave signal passed by said input polarity control means.

8. A pulse averaging circuit for use with an input having potential waveform portions of first and second polarities during first and second portions of circuit operation, said circuit comprising, a unidirectional conductive element, a filter resistor having first and second terminals, a filter capacitor having first and second terminals, said unidirectional element being arranged to operatively couple said first terminal of said filter resistor to the input of said circuit during said first polarity of said input, said second terminal of said resistor being coupled to said first terminal of said capacitor, and said capacitor being coupled by its first and second terminals across the output of said filter, a second unidirectional element and a second capacitor connected in series across said input, to charge said capacitor in the second polarity during application of potential of said second polarity to said input, impedance means having a first terminal and a second terminal, said first terminal of said impedance means being coupled to said second capacitor at a circuit point between said second capacitor and said second unidirectional element, and said second terminal of said impedance means being coupled to said first terminal of said filter resistor, and clamp means connected between said second terminal of said filter capacitor and said first terminal of said resistor, said clamp means comprising a third unidirectional element poled to conduct when a potential of said second polarity is applied to said first terminal of said filter resistor by the conduction through said impedance means.

9. Apparatus in accordance with claim 8, wherein said unidirectional elements are diodes, and said impedance means comprises a second resistor.

10. Apparatus in accordance with claim 9, further including, a third resistor, said third resistor being connected across said filter capacitor and constituting with said filter resistor a voltage divider.

* * * * *

UNITED STATES PATENT OFFICE
CERTIFICATE OF CORRECTION

PATENT NO. : 3,859,590

DATED : Jan. 7, 1975

INVENTOR(S) : John Robert Cielo; William Albert Moorman; Suryanarayana Krishnappa Rao It is certified that error appears in the above-identified patent and that said Letters Patent are hereby corrected as shown below:

Column 7, Line 7, "impedance connection between" should read ---the means to apply---

Signed and Sealed this

Nineteenth Day of October 1976

[SEAL]

*Attest:*

RUTH C. MASON
*Attesting Officer*

C. MARSHALL DANN
*Commissioner of Patents and Trademarks*